April 29, 1969   B. P. HAYWARD ET AL   3,441,448

METHOD OF MAKING AND SEALING AN ELECTRIC STORAGE BATTERY

Filed April 22, 1966   Sheet 1 of 4

United States Patent Office 3,441,448
Patented Apr. 29, 1969

3,441,448
METHOD OF MAKING AND SEALING AN
ELECTRIC STORAGE BATTERY
Brian Phillip Hayward, 78 Wagon Lane, Solihull, Warwickshire, England, Keith John Bruce McEwan, Rosendene, Littleshaw Lane, Wythall, near Birmingham, England, Robert Thomas Foster, 66 Willow Road, Solihull, Warwickshire, England, and Martin John Hoare, 16 Thorn St., Rawtenstall, Rossendale, Lancashire, England
Filed Apr. 22, 1966, Ser. No. 544,461
Int. Cl. H01m 35/18, 37/02, 1/02
U.S. Cl. 136—176                     4 Claims

ABSTRACT OF THE DISCLOSURE

The production of an electric storage battery in which a battery box having integral partition walls defining compartments within the box is moulded from a thermoplastic. Packs of plates and separators are positioned within the compartments and the intercell connections are formed through the partition walls. A lid having a peripheral edge for engaging the top of the box and ribs for engaging the tops of the partition walls is moulded from thermoplastic and the thus formed lid is welded to the box.

---

This invention relates to electric storage batteries.

In one aspect, the invention resides in an electric storage battery in which the inter-cell connections are made through partition walls formed integrally with a thermoplastic box and the box is closed by a thermoplastic lid which engages the top of the box and the partition walls and is welded thereto.

In another aspect, the invention resides in a method of manufacturing an electric storage battery, comprising placing packs of battery plates and separators within compartments in a thermoplastic battery box having integral partition walls defining said compartments, forming the required inter-cell connections through the partition walls, placing a heater in physical contact with the top peripheral edge of the box and the tops of the partition walls so as to soften them, placing a heater in physical contact with a thermoplastic lid having a peripheral edge adapted to engage the top peripheral edge of the box and ribs adapted to engage the tops of the partition walls, the heater engaging said edge of the lid and said ribs to soften them, and pressing the lid onto the box.

Figure 7:
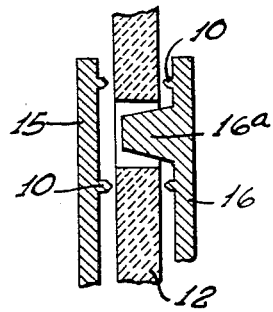
Figure 8:
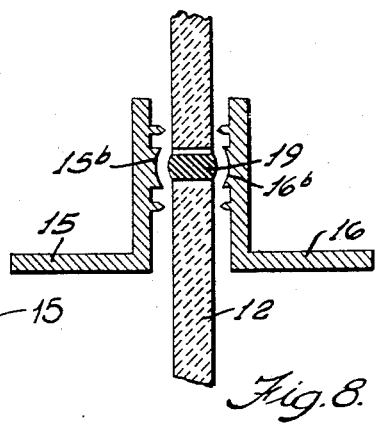
Figure 1:
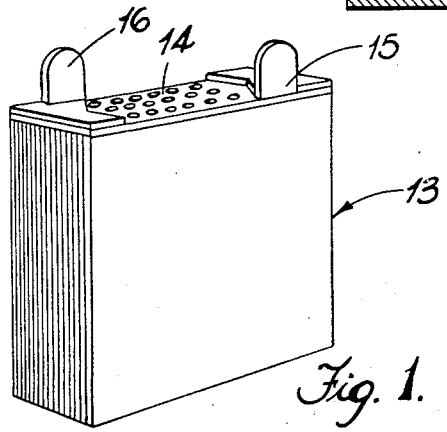
Figure 2:
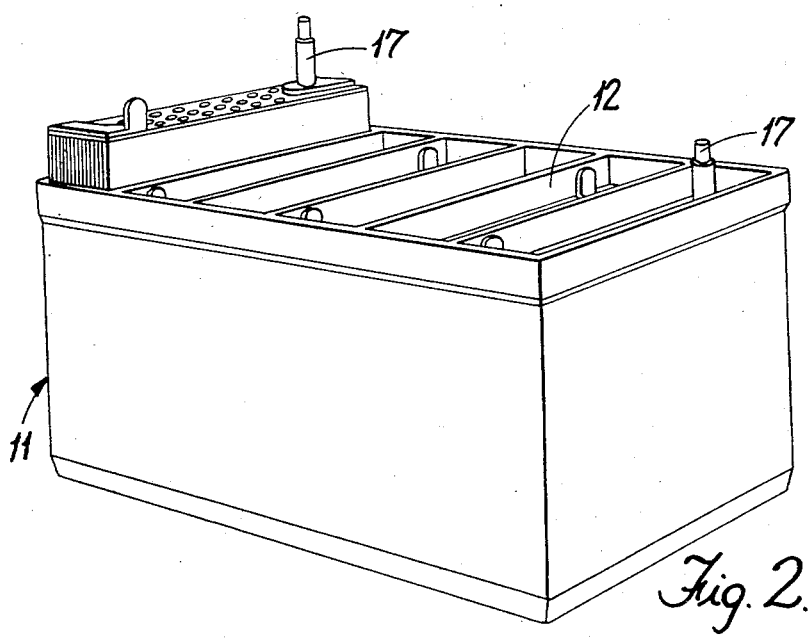
Figure 3:
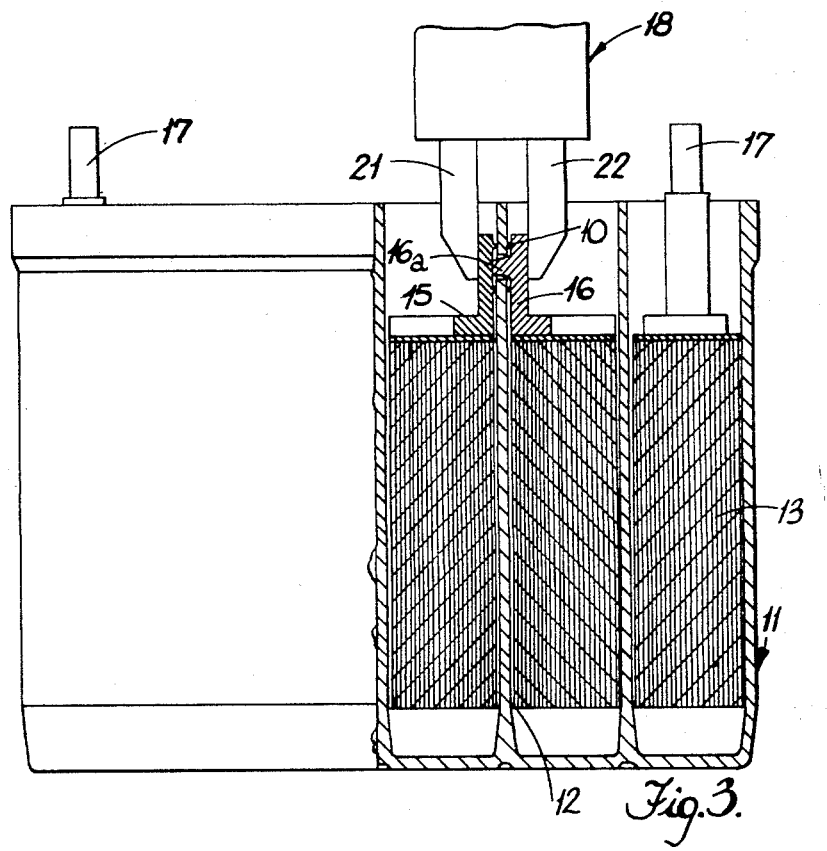
Figure 4:
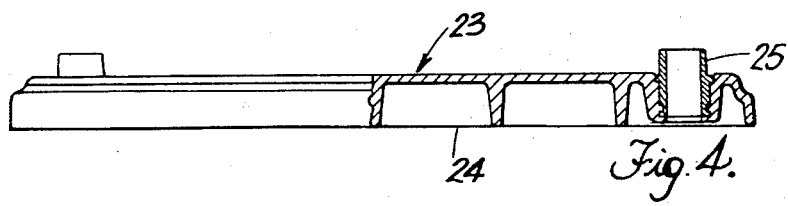
Figure 5:
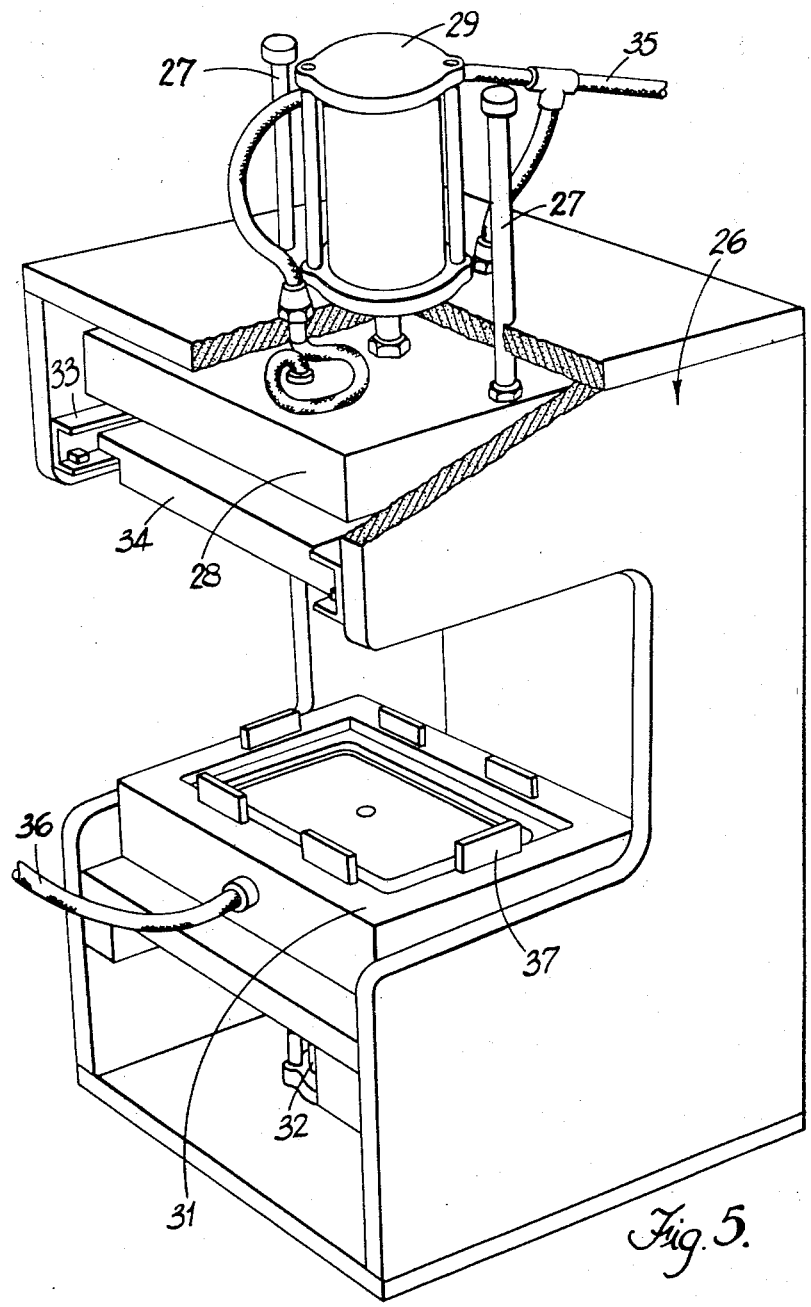
Figure 6:
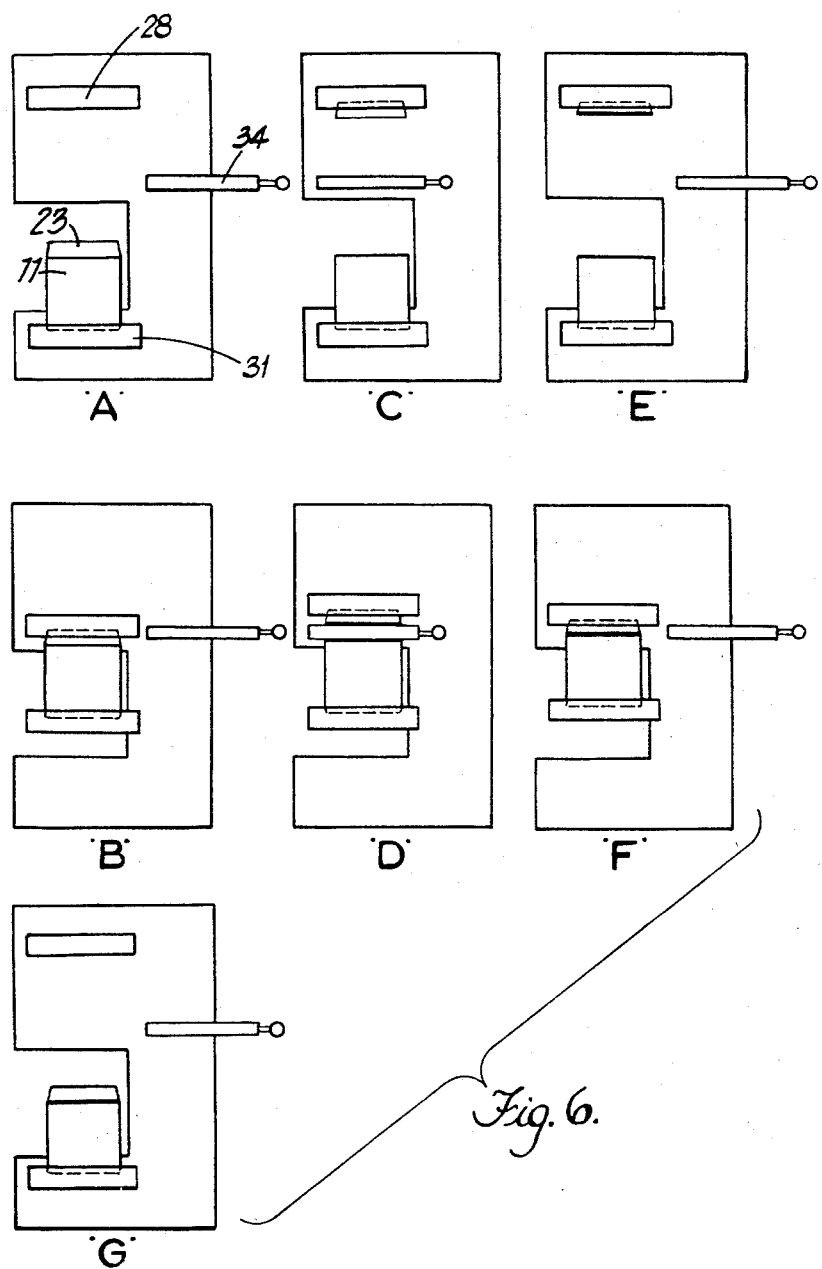

In the accompanying drawings, which illustrate the manufacture of a battery according to one example of the invention, FIGURE 1 illustrates a pack of battery plates and separators, FIGURE 2 shows a battery box with all but one of the packs in position, FIGURE 3 is a part-sectional view of the battery box illustrating the completion of the inter-cell connections, FIGURE 4 is a part-sectional view of the battery lid, FIGURE 5 is a perspective view, partly broken away, illustrating a machine used to connect the lid to the battery, FIGURE 6 is a diagram illustrating how the machine shown in FIGURE 5 is used, FIGURE 7 illustrates the inter-cell connector in detail, and FIGURE 8 illustrates a modification of the intercell connector.

Referring first to FIGURES 1 to 3, a battery box 11 is moulded from polypropylene or other suitable thermoplastic, the box including partition walls 12 dividing the box into six compartments. Each compartment receives a preformed pack 13 of battery plates and separators, the tops of the plates and separators being protected by a perforated splash guard 14. The plates in the individual packs are interconnected in parallel, and the two sets of plates in each of the four packs which are to be mounted in the central compartments of the box 11 are connected respectively to conductive connecting lugs 15, 16 formed with extensions which in use extend substantially parallel to the partition walls 12, the extensions on the lugs 16 being formed with outwardly extending spigots 16a (FIGURES 3 and 7). The packs which are to be placed in the end compartments each have one set of plates connected to a lug 15 or 16, and their other sets of plates connected respectively to the terminal posts 17 of the battery.

The partition walls 12 have holes stamped therein, and the arrangement is such that when the packs are positioned in the box 11, each spigot 16a passes through a hole and engages a lug 15 on a pack in the adjacent cell. The walls 12 are sufficiently flexible to permit introduction of the packs into the compartments before the spigots 16a enter their respective holes. It will be noted that the lugs 15, 16 are formed with integral ring-shaped upstanding portions 10 which surround the hole in the wall 12. When all the packs are in position, the required intercell connections are completed using a tool 18 shown in FIGURE 3. This tool includes a pair of electrodes 21, 22 which engage corresponding lugs 15, 16 respectively, the tool 18 being operated as follows:

Initially, pressure is applied between the electrodes to cause the portions 10 to bite into the cell wall and to ensure that the spigot 16a seats firmly against the lug 15 to the spigot 16a. During this time, the pressure is maintained and the lead flows to seal the hole in the partition wall. The portions 10 improve the seal, and in addition key the lugs 15, 16 to the wall 12 to prevent relative movement between the lugs and wall. The pressure is maintained for a short while after the flow of current is terminated so that the lead solidifies to complete the seal.

The values of current and pressure and the time for which the current is allowed to flow must be carefully chosen to give the best results. In one application the hole in the cell wall had a diameter of 0.438 inch and the mean diameter of the spigot 16a was 0.375 inch. A thrust of 1500 lbs. was applied between the lugs 15, 16 and a current of 10,800 amperes at 50 c./s. was allowed to flow for exactly 3 cycles.

FIGURE 8 shows a modification of FIGURE 7 in which a separate spigot 19 is employed, the slug having rounded ends which engage complementary surfaces 15b, 16b on the lugs 15, 16. The spigot 16b is a loose fit in the hole, but if desired it can be subjected to a coining operation before the welding operation described, so that it is a relatively tight fit in the hole.

When all the intercell connections have been made, the battery is complete apart from the lid.

The lid 23, shown in FIGURE 4, is also moulded from polypropylene or other suitable thermoplastic and has a peripheral edge adapted to engage the top of the box together with ribs 24 adapted to engage the tops of the walls 12. The lid is moulded with six filling holes (not shown) which, when the lid is in position, are above the six compartments respectively, and is further formed with a pair of integral upstanding hollow spigots 25 which receive the terminal posts 17 respectively.

The lid 23 is welded to the box 11, and for this purpose the machine shown in FIGURE 5, is used. This machining comprises a frame 26 in the upper part of which is slidably mounted a pair of guide posts 27 secured to an upper die part 28. The die part 28 is vertically movable by means of a ram 29 acting between the frame 26 and the die part 28. Moreover, a further pair of guide posts (not shown) are slidably mounted in the lower part of the frame, and are secured to a lower die part 31 which can be moved vertically towards and away from the die part 28 by a second ram acting between the die part 31 and the frame 26, part of this ram being seen at 32.

The frame 26 also supports a pair of tracks 33 on which a heater 34 is laterally slidable between the operative position shown and an inoperative position in which the die part 28 can move towards the die part 31. It should be noted that the tracks 33 do not block movement of the die part 28. The die parts 28, 31 are formed with recesses shaped to receive the lid 23 and the box 11 respectively, these recesses being connected to lines 35, 36 through which suction can be applied to the recesses.

Referring now to FIGURES 5 and 6, the sequence of operations when welding the box 11 and lid 23 is as follows: the box 11 is placed in the die part 31, accurate location of the box being ensured by guide plates 37 (FIGURE 5). The lid 23 is then placed roughly in position on the box 11, suction is applied by way of line 36 to hold the box in position, and the heater 34 is moved to its inoperative position. The parts are now in the position shown in FIGURE 6a.

As shown in FIGURE 6b, the rams 29, 32 are now actuated so that the die parts 28, 31 move towards one another and the lid 23 enters the recess in the die part 28. The shape of the lid 23 is such that if it is not accurately located on the box 11, it will adjust itself to the die part 28. When the parts are in the position shown in FIGURE 6b, suction is applied by way of line 35 to hold the lid 23 in position in the die part 28.

The die parts 28, 31 are now separated and the heater 34 is moved to its operative position as shown in FIGURE 6c. The die parts 28, 31 are then moved towards one another as shown in FIGURE 6d, so that the box and lid contact the heater, which is formed with holes (not shown) through which the posts 17 extend.

The parts are left in the position shown in FIGURE 6d for a predetermined time so that the polypropylene becomes soft. The box 11 requires more heating than the lid because of its cross-section, and this is conveniently effected by arranging that the ram 32 exerts a greater pressure than the ram 29. After the required heating period, the parts 29, 31 are separated and the heater is moved to its inoperative position as shown in FIGURE 6e. The lid and box are then moved into contact as shown in FIGURE 6f, and the pressure exerted by the rams 28, 31 causes the lid 23 to be welded to the box 11 around the peripheral edge and along the junctions of the ribs 24 and walls 12. Finally, the suction in line 35 is released, and the parts 28, 31 are separated so that the box and lid remain on the part 31, as shown in FIGURE 6g.

In order to complete the battery, the terminals are completed by placing a lead insert around the posts 17, placing a jig around the post and insert, and pouring lead into the jig. The battery can be filled with electrolyte and charged.

In a modification, separate heaters are used for the lid and box. In another modification, the peripheral edge of the box 11 is formed with an upwardly projecting flange flush with the inner surface of the box, and the lid 23 is formed with a complementary downwardly projecting flange, the two flanges interengaging when the box and lid are engaged. The heater is shaped to weld the box and lid along the horizontal joint line between the top of the flange on the box and the lid.

Having thus described our invention what we claim as new and desire to secure by Letters Patent is:

1. A method of manufacturing an electric storage battery, comprising the following steps:
  (i) placing packs of battery plates and separators within compartments in a thermoplastic battery box having integral partition walls defining said compartments,
  (ii) forming the required intercell connections through the partition walls,
  (iii) placing a heater in physical contact with the top peripheral edge of the box and the tops of the partition walls so as to soften them,
  (iv) placing a heater in physical contact with a thermoplastic lid having a peripheral edge adapted to engage the top peripheral edge of the box and ribs adapted to engage the tops of the partition walls, the heater engaging said edge of the lid and said ribs to soften them,
  (v) pressing the lid onto the box.

2. A method as claimed in claim 1 in which the same heater is used to soften the lid and box simultaneously, but the box is pressed against the heater with a greater force than the lid.

3. A method as claimed in claim 2 in which each intercell connection is made by connecting the battery plates in the two cells which are to be interconnected to a pair of conductive lugs respectively which at their ends adjacent the partition wall are formed with extensions extending substantially parallel to the partition wall, an electrically conductive spigot being inserted in a hole in the partition wall and being welded to said extensions.

4. A method as claimed in claim 3 in which the spigot is formed integrally with one of the lugs.

References Cited

UNITED STATES PATENTS 1,784,216 12/1930 Aldrich et al.
2,697,162 12/1954 Quandt _____ 136—170 XR

FOREIGN PATENTS 1,160,516 1/1964 Germany.

WINSTON A. DOUGLAS, Primary Examiner.
DONALD L. WALTON, Assistant Examiner.

U.S. Cl. X.R.
136—170